(12) United States Patent
Clark et al.

(10) Patent No.: US 6,581,509 B1
(45) Date of Patent: Jun. 24, 2003

(54) ROTARY CYLINDER ASSEMBLY FOR A MACHINE TOOL

(75) Inventors: Philip Dan Clark, Kokomo, IN (US); Alan Claxton, Walton, IN (US); David Claxton, Kokomo, IN (US); Gregory A. Stephens, Russiaville, IN (US)

(73) Assignee: Stephens Dynamics, Inc., Kokomo, IN (US)

( * ) Notice: Subject to any disclaimer, the term of this patent is extended or adjusted under 35 U.S.C. 154(b) by 0 days.

(21) Appl. No.: 09/866,197

(22) Filed: May 25, 2001

(51) Int. Cl.[7] .................................................. F15B 11/08
(52) U.S. Cl. ........................ 92/106; 91/420; 279/4
(58) Field of Search ............................... 92/106; 91/420, 91/445; 279/4

(56) References Cited

U.S. PATENT DOCUMENTS

| | | | |
|---|---|---|---|
| 3,364,823 A | | 1/1968 | Benjamin et al. |
| 3,596,567 A | * | 8/1971 | Benjamin et al. ............. 91/420 |
| 3,641,875 A | | 2/1972 | Kodalle |
| 3,933,167 A | | 1/1976 | Byers, Jr. |
| 3,972,537 A | | 8/1976 | McClelland |
| 3,988,969 A | * | 11/1976 | Lioux ........................... 91/420 |
| 4,008,731 A | | 2/1977 | Katz |
| 4,040,338 A | | 8/1977 | Wilson et al. |
| 4,221,160 A | | 9/1980 | Selden |
| 4,249,451 A | | 2/1981 | Le Moal |
| 4,319,516 A | * | 3/1982 | Rohm .......................... 91/420 |
| 4,523,632 A | * | 6/1985 | Nobukawa et al. ............ 92/106 |
| 4,621,568 A | * | 11/1986 | Gailey ......................... 279/4.02 |
| 4,669,362 A | * | 6/1987 | Nobukawa et al. ......... 279/4.02 |
| 4,716,933 A | | 1/1988 | Stoever et al. |
| 4,747,337 A | | 5/1988 | Ohota |
| 4,996,908 A | | 3/1991 | Thompson |
| 5,221,098 A | | 6/1993 | Ayzenshtok et al. |
| 5,437,216 A | | 8/1995 | Chapman |
| 5,901,967 A | | 5/1999 | Morisaki |

\* cited by examiner

*Primary Examiner*—Edward K. Look
*Assistant Examiner*—Igor Kershteyn
(74) *Attorney, Agent, or Firm*—Woodard, Emhardt, Moriarty, McNett & Henry LLP

(57) ABSTRACT

A rotary cylinder assembly for a machine tool is provided that includes a lock check system that locks the work piece to the machine tool chuck and prevents extension and retraction of the work piece in the event of loss of hydraulic or pneumatic pressure. The rotary cylinder assembly includes a shaft end cover coupled between a fluid shaft housing and a cylinder body. The shaft end cover houses the lock check system and includes a number of flow paths that provide for extension and retraction of a piston rod connector housed in the cylinder body in response to fluid pressure supplied from the fluid shaft housing. The shaft end cover and lock check system are configured to allow small diameter cylinder bodies to be coupled thereto while providing the safety and functional features associated with the lock check system.

28 Claims, 6 Drawing Sheets

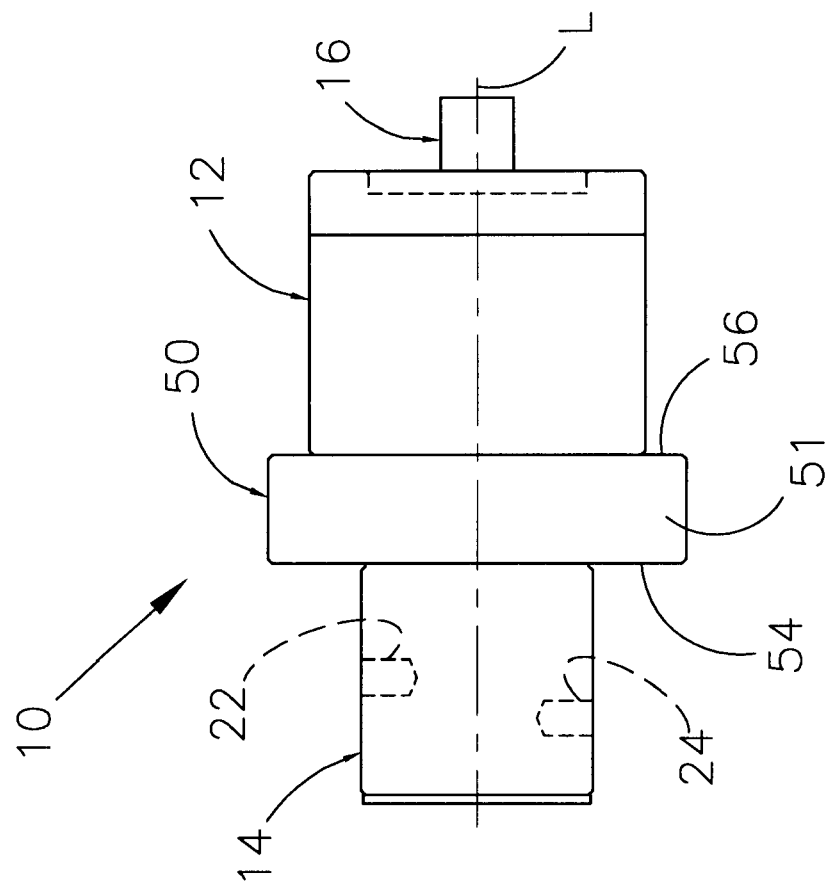
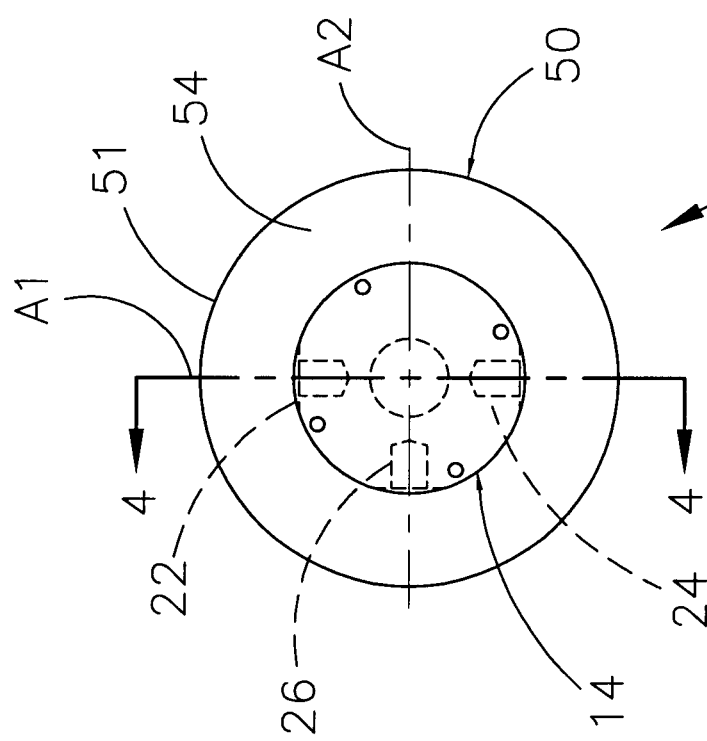

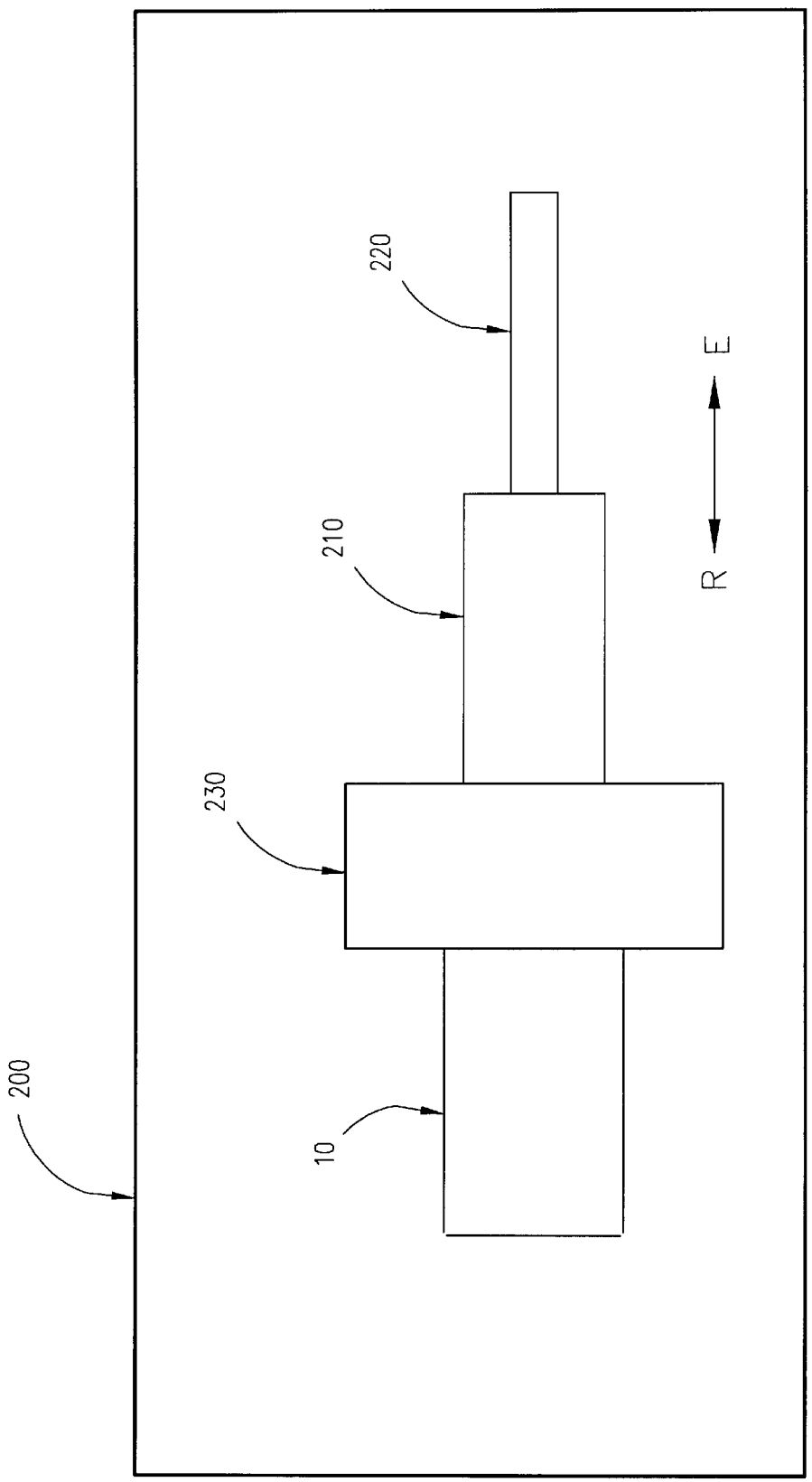

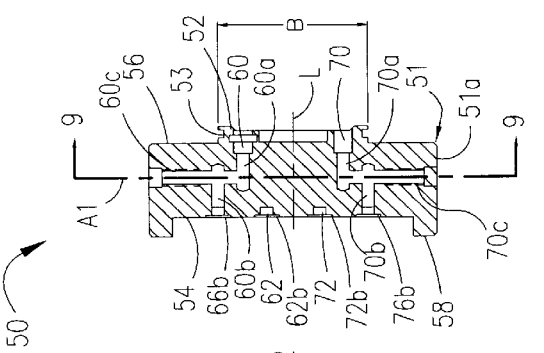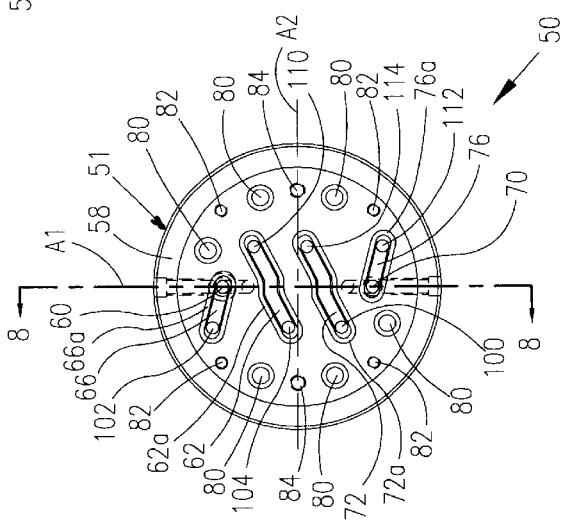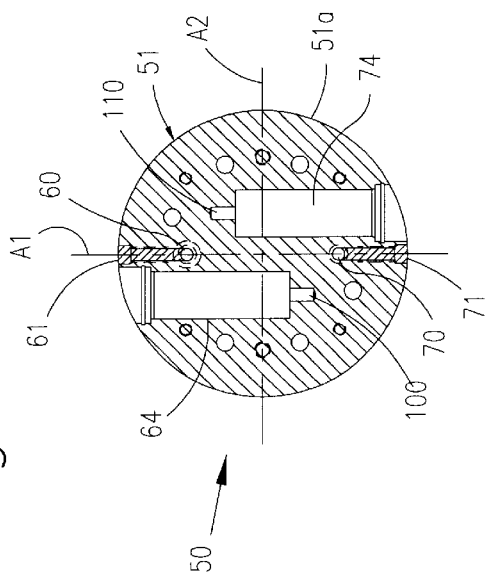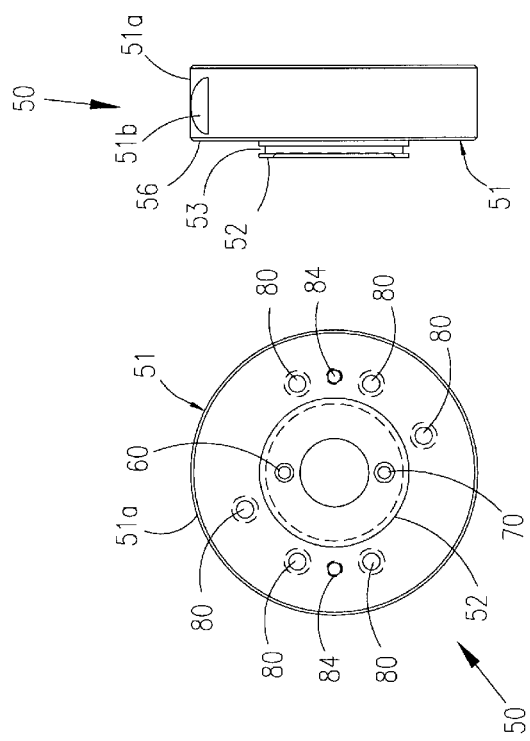

ROTARY CYLINDER ASSEMBLY FOR A MACHINE TOOL

FIELD OF THE INVENTION

The present invention is related generally to the field of machine tools, and more particularly to rotary cylinder assemblies for machine tools.

BACKGROUND OF THE INVENTION

Machine tools use rotary cylinder assemblies to direct pressurized fluid into a cylinder body that houses a piston for extending or retracting a work piece, and also to direct the pressurized fluid to actuate a chuck that grips the work piece. Many machine tools operate under high fluid pressure environments and rotate the work piece at several thousand revolutions per minute. The high fluid pressure and speeds raise safety concerns. For example, if fluid pressure supplied to the rotary cylinder assembly were suddenly lost, the rotary cylinder could lose its ability to maintain axial force. Thus, the work piece chuck could lose its gripping capability, causing the work piece to be thrown off the chuck and potentially injuring persons nearby.

In order to address these safety concerns, prior art fluid systems for machine tools have incorporated check valve systems into their components to allow trapping or isolation of fluid pressure in the cylinder body and machine tool chuck in the event of loss of fluid pressure. However, prior art check valve systems have some structural and functional disadvantages. For example, the required size of the components and complex configurations employed to accommodate flow passages to the check valve system can make fabrication and assembly costly. It is further believed check valve systems have not been employed with a cylinder body having a piston chamber bore diameter at least as small as three inches. The use of large pneumatic and/or hydraulic components in light duty machine tool applications reduces the useful life of these components for use in medium and heavy duty applications, and also increases fabrication costs.

Therefore, there remains a need for an improved rotary cylinder assembly that employs a lock check system to control fluid flow and pressure for operation of a machine tool work piece. The improved rotary cylinder assembly should be able to employ small components for light duty machine tool requirements while providing the safety of the check valve system in the event of fluid pressure loss. The improved rotary cylinder assembly should also reduce the complexity of fabrication required of the rotary cylinder components needed to house the check valve system. The present invention is directed to provide an improved rotary cylinder assembly that meets these needs, among others.

SUMMARY OF THE INVENTION

The present invention is directed to a rotary cylinder assembly for a machine tool that includes a shaft end cover having lock check system that maintains fluid pressure in the cylinder body in the event fluid supply pressure is lost or disrupted. As used herein, the term fluid is intended to encompass any media used in machine tool operation. Aspects of the invention may also have application outside the field of machine tools.

According to one aspect of the invention, there is provided a rotary cylinder assembly that includes a fluid shaft housing coupled to a shaft end cover that houses a lock check system. A cylinder body having an internal bore diameter at least as small as three inches can be coupled to the other side of the shaft end cover. The cylinder body has a piston in the bore that extends and retracts a work piece in response to fluid pressure from a pressurized fluid source selectively supplied to extend and retract ports on the fluid shaft housing. The lock check system includes a pair of check valves, each of which can be selectively piloted open to allow fluid from the other lock check to reverse flow therethrough, thus moving the piston between its extend and retract positions. When fluid supply pressure is lost, the check valve piloted open closes, and the check valve isolates the pressurized fluid in the cylinder body, preventing further extension and retraction of the work piece and locking the work piece to the work piece chuck until fluid supply pressure is restored.

In another aspect of the invention, a rotary cylinder assembly is provided that uses fluid pressure in a cylinder body that houses a piston to extend and retract a work piece in accordance with pressure supplied from one of a retract port or an extend port in a fluid shaft housing. The rotary cylinder assembly includes a lock check system between the fluid shaft housing and the cylinder body that maintains the fluid pressure in the cylinder body to prevent work piece extension or retraction in the event of pressure loss to the extend and retract ports.

In a preferred form, the lock check system includes a pair of lock check cartridges that are housed in a shaft end cover. The lock check system further includes a number of flow paths that extend through the shaft end cover and between the cartridges. In a further preferred form, the number of flow paths of the lock check system includes a first flow path that extends between the pilot port of the first lock check cartridge and the inlet port of the second lock check cartridge, and a second flow path that extends between the pilot port of the second lock check cartridge and the inlet port of the first lock check cartridge. At least a portion of each of the first and second flow paths is formed by a channel in the end face of the shaft end cover. Preferably, the channel is surrounded by a seal that sealingly contacts the fluid shaft housing when the shaft end cover is coupled thereto. In another preferred form, each channel has an offset at the mid-portion of its length.

According to another aspect of the present invention, there is provided a shaft end cover that houses a lock check system. The lock check system includes a pair of lock check cartridges that are housed in a shaft end cover and a number of flow paths in the shaft end cover that interconnect the lock check cartridges and provide fluid flow through the shaft end cover. The number of flow paths of the lock check system include a first flow path that extends between the pilot port of the first lock check cartridge and the inlet port of the second lock check cartridge, and a second flow path that extend between the pilot port of the second lock check cartridge and the inlet port of the first lock check cartridge. At least a portion of each of the first and second flow paths is formed by a channel in the end face of the shaft end cover. Outlet channels can also be provided in the end face of the shaft end cover that extend between an outlet of each lock check cartridge and an adjacent extend or retract through port that extends through the shaft end cover.

Other forms, features, aspect, embodiments, and advantage of the present invention will be apparent in the following description of the preferred embodiment.

BRIEF DESCRIPTION OF THE DRAWINGS

FIG. 1 is an elevational view of a rotary cylinder assembly having application with a machine tool according to the present invention.

FIG. 2 is a left hand end elevational view of the rotary cylinder assembly of FIG. 1.

FIG. 3 is a block diagram of the rotary cylinder assembly of the present invention mounted to a machine tool.

FIG. 5 is an end elevational view of a shaft end cover comprising a portion of the rotary cylinder assembly of FIG. 1 looking at the face coupled to the cylinder body.

FIG. 6 is a right hand side elevational view of the shaft end cover of FIG. 5.

FIG. 7 is an end elevational view of the shaft end cover of FIG. 5 looking at the face coupled to the fluid shaft housing.

FIG. 8 is a cross-sectional view of the shaft end cover of FIG. 5 taken through line 8—8 of FIG. 5.

FIG. 9 is a cross-sectional view of the end shaft cover of FIG. 5 taken through line 9—9 of FIG. 8.

DESCRIPTION OF THE PREFERRED EMBODIMENTS

Figure 4:
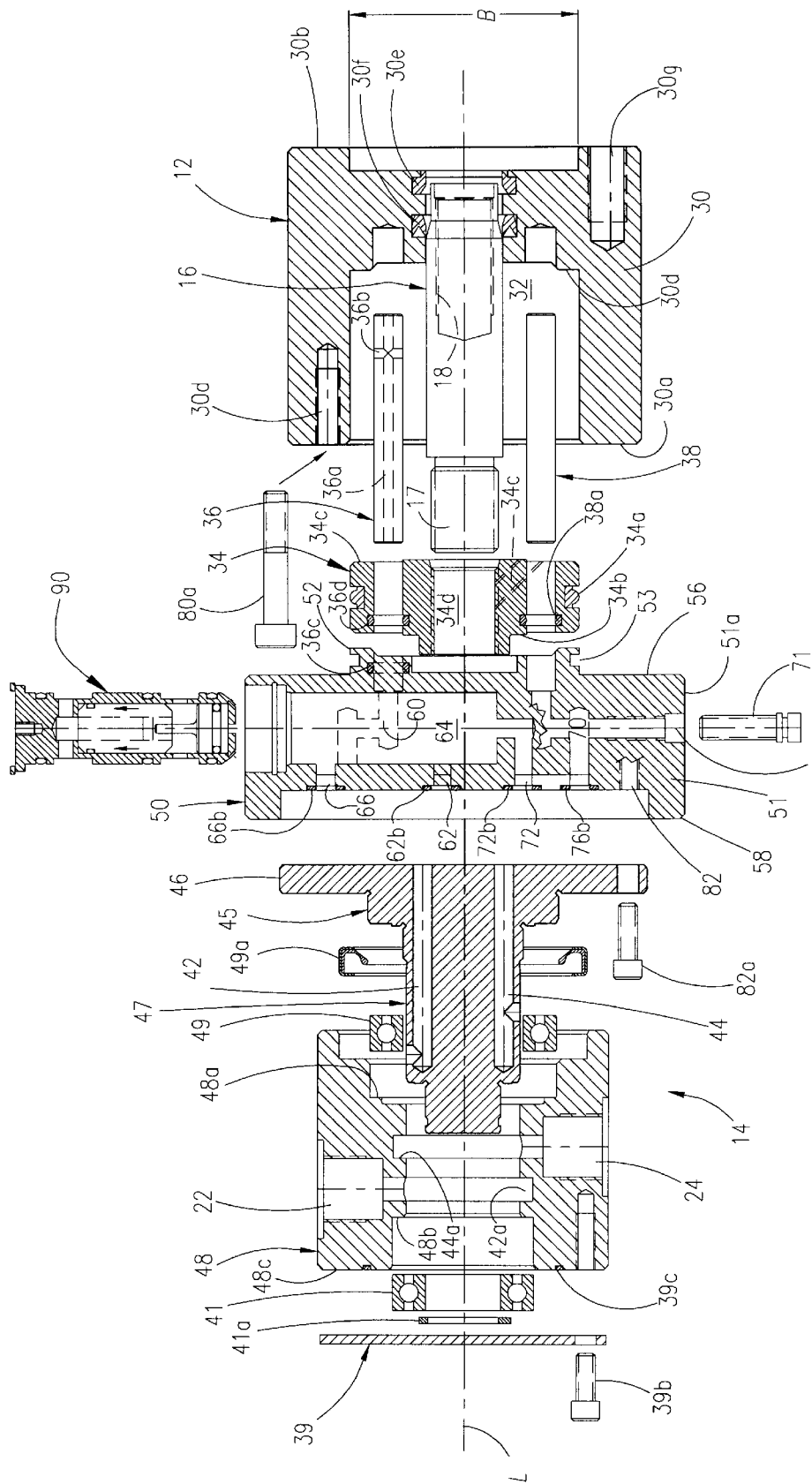
FIG. 4 is an exploded sectional view taken through the rotary cylinder assembly of the present invention taken through line 4—4 of FIG. 2 with a portion of the section through the shaft end cover offset through the first lock check receptacle.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any such alterations and further modifications in the illustrated devices and described methods, and any such further applications of the principles of the invention as illustrated herein are contemplated as would normally occur to one skilled in the art to which the invention relates.

Referring to FIGS. 1–3, there is shown a rotary cylinder assembly 10 that can be coupled to a machine tool 200 as shown in FIG. 3 in block diagram form. Rotary cylinder assembly 10 is particularly adaptable for use with a small work piece 220 that is desirable for light duty machining applications. However, rotary cylinder 10 can also be used with large work pieces and for medium and heavy duty machining applications. Machine tool 200 includes a spindle 230 coupled to a work piece chuck 210. Cutting tool or work piece 220 is engaged by work piece chuck 210. Work piece 220 can be any type of tool used with a machine tool to perform various machining operations, such as a lathe, drill, mill or punch, for example.

Rotary cylinder assembly 10 is preferably a solid body rotary cylinder which does not include a through-hole for the spindle shaft, but rather includes a connector that is mounted directly to and forms an extension of the spindle shaft. Pressurized fluid from machine tool 200 is connected to rotary cylinder assembly 10 and is used to extend or retract tool 220 as indicated by arrows E (extend) and R (retract). The shaft of spindle 230 is rotated by the motor of machine tool 200 to rotate work piece 220 and cylinder assembly 10 to perform machining operations. Furthermore, while rotary cylinder assembly 10 is illustrated as horizontally oriented in FIG. 3, other orientations, such as vertical or inclined orientations, are also contemplated.

Rotary cylinder assembly 10 includes a cylinder body 12, a fluid shaft housing 14, and a shaft end cover 50 positioned between and coupled to cylinder body 12 and fluid shaft housing 14. Rotary cylinder assembly 10 includes a central longitudinal axis L extending therethrough about which rotary cylinder assembly 10 rotates. Shaft end cover 50 further includes a first central axis A1 extending through a center thereof and orthogonal to longitudinal axis L, and a second central axis A2 extending through a center of shaft end cover 50 that is orthogonal to first central axis A1 and to longitudinal axis L.

Shaft end cover 50 has a body 51 with a first face 54 and an opposite second face 56. Cylinder body 12 is coupled to shaft end cover 50 against second face 56. Cylinder body 12 further includes a piston rod connector 16 extending therefrom which is internally threaded or includes other attachment means known in the art to secure rotary cylinder assembly to the shaft of spindle 230. Piston rod connector 16 can have a fluid passage therethrough in communication with work piece chuck 210 to provide pressurized fluid to grip work piece 220. Such pressure-actuated chucks are known in the art and will not be described further herein.

Referring now further to FIG. 4, further discussion relating to cylinder body 12 and fluid shaft housing 14 will be provided. Cylinder body 12 includes a cylindrical piston housing 30 that has inner bore therein forming a piston chamber 32. Housing 30 has an end face 30a around chamber 32 in abutting contact with second face 56 of shaft end cover 50. Cylinder body 12 is mounted on a ring member 52 extending from second face 56 of shaft end cover 50. Ring member 52 has an annular groove 53 formed therein into which a seal can be placed in order to provide a sealing interface between cylinder body housing 30 and shaft end cover 50. Piston chamber 32 has an inner diameter B at end face 30a. In one specific embodiment, it is contemplated diameter B of piston chamber 32 is as small as about three inches. However, other sizes for the opening are also contemplated, including 4.5 inches and 6 inches, for example.

Piston chamber 32 has a piston 34 movably mounted therein having an annular groove formed therearound in which piston seal 34a is placed to sealingly contact the inner walls of chamber 32. Piston 34 has a first side 34b and an opposite second side 34c. Piston 34 further includes an inner bore 34d opening at first side 34b that extends therethrough and opens at second side 34c of piston 34.

Rod connector 16 is mounted in bore 34d by preferably threadedly attaching threaded end 17 of rod connector 16 thereto. Other means for attachment known to those skilled in the art are also contemplated. Piston 34 further includes a bore 34e that receives a set screw to prevent connector rod 16 from unscrewing from piston 34. Rod connector 16 extends through chamber 32 and piston housing 30 and beyond mounting face 30b. Seals 30e and 30f seal the interface between rod connector 16 and piston housing 30 to prevent fluid leakage. Rod connector 16 includes an internally threaded receptacle 18 for engagement with machine tool spindle 230. Movement of piston 34 in chamber 32 effects extension and retraction of rod connector 16, and thus machine tool spindle 230 and work piece 220. A tapped hole 30g is also provided in piston housing 30 for attachment of spindle 230 thereto.

Piston 34 is guided in chamber 32 by a first pin 36 and a second pin 38 that extend through piston 34. Pins 36, 38 are secured at one end to housing 30 and extend through chamber 32 and into retract and extend through ports 60, 70, respectively, of shaft end cover 50. Through port 70 is sized with respect to second pin 38 to allow fluid flow therearound to provide pressurized fluid against first side 34b of piston 34. This moves piston 34 from its retracted position of FIG. 4 to an extended position wherein piston 34 is positioned against end wall 30d of housing 30. A seal 38a provides a sealing interface between piston 34 and second pin 38. First pin 36 defines a flow conduit 36a extending therethrough having an outlet 36b. A first seal 36c provides a sealing interface between first pin 36 and shaft end cover 50 at through port 60. A second seal 36d provides a sealing interface between first pin 36 and piston 34. Flow conduit 36a is in fluid communication with retract through port 60 in order to provide pressurized fluid against second side 34c of piston 34 to move piston 34 and the connected work piece 220 to the retracted position shown in FIG. 4.

Fluid shaft housing 14 has a central shaft member 45 that includes a base flange 46 secured against first face 54 of shaft end cover 50 in the recess formed by lip 58. Shaft member 45 also includes a cylindrical central member 47 extending from base flange 46. A cylindrical housing member 48 has a hollow interior and is positioned around central member 47. Inner bearings 49 are positioned in an annular recess 48a of housing member 48 that opens toward shaft end cover 50, and outer bearings 41 are positioned in an annular recess 48b that opens away from shaft end cover 50. An oil seal 49a can be provided if fluid shaft housing 45 requires oil to lubricate bearings 41, 49. Other embodiments, such as a pneumatic rotary cylinder assembly 10, contemplate that bearings 41, 49 are self-lubricating and oil seal 49a is not required. A retaining ring 41a is provided to retain outer bearings 41 on central member 47. Outer retaining bearings 41 and inner bearings 49 secure housing member 48 to central member 47 while allowing shaft member 45, shaft end cover 50, and cylinder body 12 to rotate relative to housing member 48. An endplate 39 is sealingly attached to end wall 48c of housing member 48 by fasteners 39b and seal 39c to protect bearings 41 and the internal components of fluid shaft housing 14.

Housing member 48 includes ports that can receive mechanical fittings, seals and couplings or other connecting devices known in the art to connect fluid shaft housing 14 to a pressurized fluid supply. The pressurized fluid can be any fluid type used in machine tool applications, such as hydraulic fluid or air. This pressurized fluid is used to move piston 34 and extend or retract piston rod connector 16 and work piece 220 as discussed herein and also to actuate work tool chuck 210 to grip work piece 220.

Fluid shaft housing 14 includes a retract port 22, an extend port 24, and a vent port 26 formed in housing member 48. In the illustrated embodiment, retract port 22 and extend port 24 are offset from one another along first central axis A1; however, ports 22, 24 may be positioned at any location about housing member 48. Fluid shaft housing 14 further includes a vent port 26 for venting air to prevent air passage through the bearings. A further hydraulic drain port (not shown) can also be provided with hydraulic cylinders to direct bearing lubricating oil to an oil tank.

Retract port 22 is in fluid communication with a retract flow passage 42 formed through shaft member 45 and, as described further below, in communication with a retract pilot channel 62 of shaft end cover 50. Housing member 48 includes an annular flow path 42a that maintains fluid communication between retract port 22 and retract flow passage 42 as central member 47 rotates in housing member 48. Extend port 24 is in fluid communication with an extend flow passage 44 formed through shaft member 45 and, as described further below, in communication with an extend pilot channel 72 of shaft end cover 50. Housing member 48 includes an annular flow path 44a that maintains fluid communication between extend port 24 and extend flow passage 44 as central member 47 rotates in housing member 48.

Referring now further to FIGS. 5–9, further details regarding shaft end cover 50 will be described along with the lock check system housed therein. Shaft end cover 50 has cylindrical body 51 having a sidewall 51a extending between first face 54 and second face 56 at lip 58. The lock check system of shaft end cover 50 includes extend and retract through ports, lock check cartridges, and channels formed in first face 54 that interconnect the lock check cartridges and the through ports. The lock check system provides fluid flow through shaft end cover 50 to move piston 34 and extend or retract rod connector 16, and further provides safety by maintaining the pressure in cylinder body 12 and the machine tool chuck in the event the fluid supply pressure is disrupted.

Shaft end cover 50 includes a retract through port 60 and an extend through port 70 formed therethrough. Retract through port 60 includes a first portion 60a extending from second face 56 to the center of shaft end cover 50 at first central axis A1. Retract through port 60 further includes a second portion 60b extending from first central axis A1 to first face 54. A connecting portion 60c extends along first central axis A1 between first portion 60a and second portion 60b. Connecting portion 60c is plugged by plug 61 extending from sidewall 51a of shaft end cover 50. In a similar manner, extend through port 70 includes a first portion 70a extending between second face 56 to first central axis A1 and a second portion 70b extending between first face 54 and central axis A1. A third connecting portion 70c extends between and connects first portion 70a to second portion 70b. Third portion 70c is plugged by a plug 71 extending from sidewall 51a of shaft end cover 50.

Figure 10:
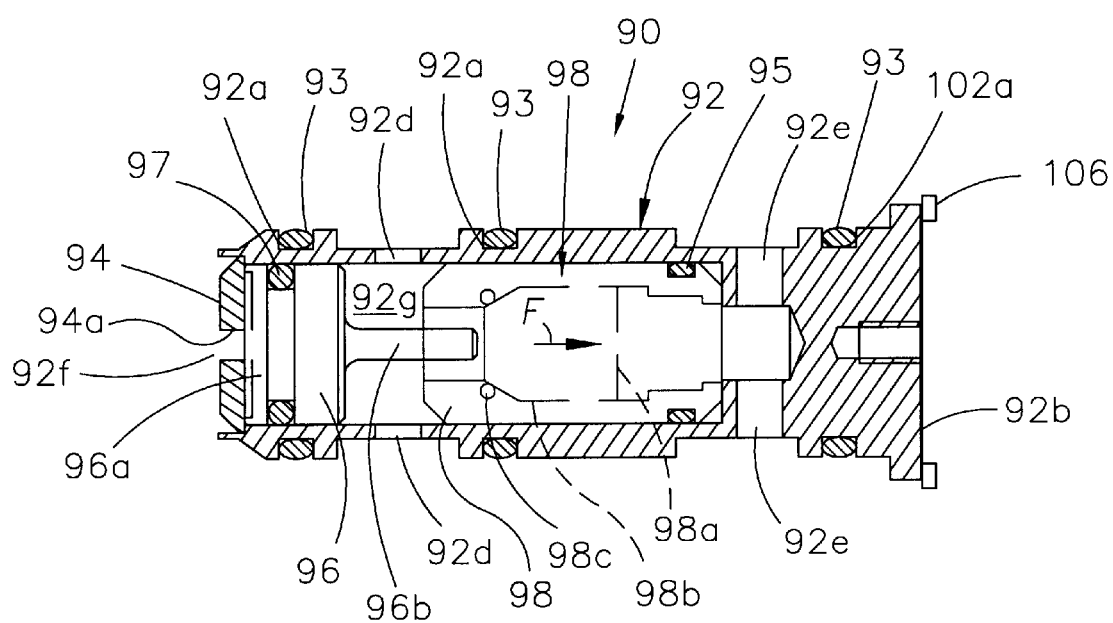
FIG. 10 is an elevational view of a lock check cartridge comprising a portion of the lock check system housed in the shaft end cover of FIG. 5.

As shown in FIG. 9, shaft end cover 50 includes a first receptacle 64 formed therein on a first side of a central axis A1. A first lock check cartridge, such as lock check cartridge 90 of FIG. 10, is positioned in first receptacle 64. Shaft end cover 50 also includes a second receptacle 74 formed therein on the opposite side of a central axis A1 and extending parallel to first receptacle 64. A second lock check cartridge, such as lock check cartridge 90 of FIG. 10, can be positioned in second receptacle 74. After the lock check cartridges are inserted into receptacles 64, 74, a plug cap 51b can be placed in receptacles 64, 74 and secured to the end walls of the lock check cartridges to give sidewall 51a a smooth profile. First receptacle 64 is in fluid communication with an extend pilot port 100 and second receptacle 74 is in communication with a retract pilot port 110. As shown in FIG. 7, first receptacle 64 is also in fluid communication with a first inlet port 104 and a first outlet port 102. Second receptacle 74 is similarly in fluid communication with a second inlet port 114 and a second outlet port 112.

First outlet port 102 is in fluid communication with retract through port 60 via a retract channel 66 formed therebetween in first face 54. Similarly, second outlet port 112 is in fluid communication with extend through port 70 via an extend channel 76 formed therebetween in first face 54. Shaft end cover 50 further includes first pilot channel 62 formed in first face 54 that extends between retract pilot port 110 and first inlet port 104. Shaft end cover 50 also includes second pilot channel 72 formed in first face 54 that extends between extend pilot port 100 and second inlet port 114.

First and second pilot channels 62, 72 extend across first face 54 in a generally diagonal direction that is non-orthogonal to both first axis central axis A1 and second central axis A2. This allows the pilot ports 100, 110 of each lock check cartridge, which are substantially positioned on opposite sides of second central axis A2, to extend beyond second central axis A2, thus providing a region of overlap between lock check cartridges.

Furthermore, each pilot channel 62, 72 has an offset middle portion at its intersection with first central axis A1. This middle portion extends generally parallel with second central axis A2, providing pilot channels 62, 72 with a slight S-shape. The smaller the diameter B of chamber 32 of cylinder body 12, the closer first portions 60a, 70a of through ports 60, 70 are positioned to longitudinal axis L. The offset middle portions of pilot channels 62, 72 avoid overlap between channels 62, 72 and the adjacent first portions 60a, 70a, of through ports 60, 70. By avoiding this overlap, the necessary wall thickness for the structural integrity of shaft end cover 50 is maintained while allowing use of a cylinder body 12 having a small chamber diameter B. In one specific embodiment, it is contemplated that this diameter B is at least as small as three inches.

Each of the channels 62, 72, 66, 76 formed in first face 54 can include lands 62a, 72a, 66a, 76a, respectively, formed therearound to receive a sealing members 62b, 72b, 66b, 76b, respectively (FIG. 4). These sealing members seal the channels against the end flange 46 of fluid shaft housing 14.

Shaft end cover 50 further includes a number of bores 80 formed therethrough alignable with holes 30f of piston housing 30 in which fasteners 80a can be placed to couple shaft end cover 50 and shaft member 45 to cylinder body 12. Shaft end cover 80 also includes a pair of through holes 84 formed therethrough on opposite sides of first central axis A1 to receive jacking screws or bolts to assist in disassembling shaft end cover 50 from cylinder body 12. Shaft end cover 50 further includes a number of holes 82 formed partially therethrough which receive fasteners 82a to couple shaft member 45 to first face 54.

Referring now to FIG. 10, details of a lock check cartridge 90 that is housed in lock check receptacles 64, 74 will now be described. Lock check cartridge 90 includes a cartridge body 92. Cartridge body 92 has a hollow bore 92g formed therethrough and grooves 92a around its perimeter in which O-ring seals 93 are placed. A snap ring 106 is placed at the outer end 92b of cartridge body 92 to secure cartridge 92 in its respective receptacle 64, 74. Cartridge body 92 has an end opening 92f at inner end 92c, one or more inlet holes 92d, and one or more fluid outlet holes 92e adjacent outer end 92b.

Lock check cartridge 90 houses a check valve 98 in bore 92g and is in sealing engagement therewith via O-ring seal 95. Check valve 98 has a valve member 98a that is normally biased against valve seat 98b, but is shown displaced from seat 98b in FIG. 10 as would occur with fluid flow in the direction of arrow F. In one embodiment, it is contemplated that check valve 98 is a KEPSEL cartridge type valve insert as sold by Kepner Products Company, Model #2206-C-18-25. However, the present invention also contemplates the use of other check valve types.

In order to extend or retract the work piece, fluid flows through the appropriate one of the lock check cartridges in the direction of arrow F. Pressurized fluid from inlet holes 92d, which are in communication with a respective one of the inlet ports 104, 114 of shaft end cover 50, pushes valve member 98a off of seat 98b. Fluid flows around valve member 98a and through check valve 98 in the direction of arrow F and out the outlet holes 92e, which are in communication with a respective ones of the outlet ports 102, 112 of shaft end cover 50. Unless check valve 98 is piloted open as described below, reverse fluid flow opposite arrow F cannot occur through check valve 98 since valve member 98a is pushed against seat 98b.

Lock check cartridge 90 houses an end cap 94 having a through-hole 94a at end opening 92f. A pilot piston 96 having a head 96a is sealingly and moveably engaged to body 92 in chamber 92g via pilot seals 97. Pilot piston 96 further has a check valve release 96b extending from head 96a. When pilot piston 96 is not actuated, as shown in FIG. 10, piston head 96a is in contact with end cap 94. This prevents fluid entering inlet holes 92d from flowing out through-hole 94a of end cap 94.

In order to extend and retract piston 34 in cylinder body 12, it is necessary to provide for fluid flow in the direction of arrow F through one of the lock check cartridges and to provide reverse fluid flow in the direction opposite arrow F through the other lock check cartridge in order to allow the displaced fluid to escape chamber 32 of cylinder body 12. Check valve 98 is opened for reverse flow by pilot piston 96. Through-hole 94a and end opening 92f are in communication with a respective one of the pilot ports 100, 110. Pressure is supplied from pilot port 100, 110 and through through-hole 94a to displace piston 96 in the direction of arrow F. Release member 96b contacts valve member 98a and pushes it off seat 98b. Valve member 98a is held off seat 98b by release member 96b to allow fluid from outlet holes 92e to flow around valve member 98a in the direction opposite arrows F and out through check holes 98c to inlet holes 92d. Reverse fluid flow can be maintained until the fluid pressure from pilot port 100, 110 is less than the pressure of the fluid entering from outlet holes 92e. In the event fluid pressure is lost to pilot port 100, 110, piston 96 will return to its FIG. 10 position and valve member 98a will be normally biased to contact seat 98b and prevent reverse fluid flow.

Figure 11:
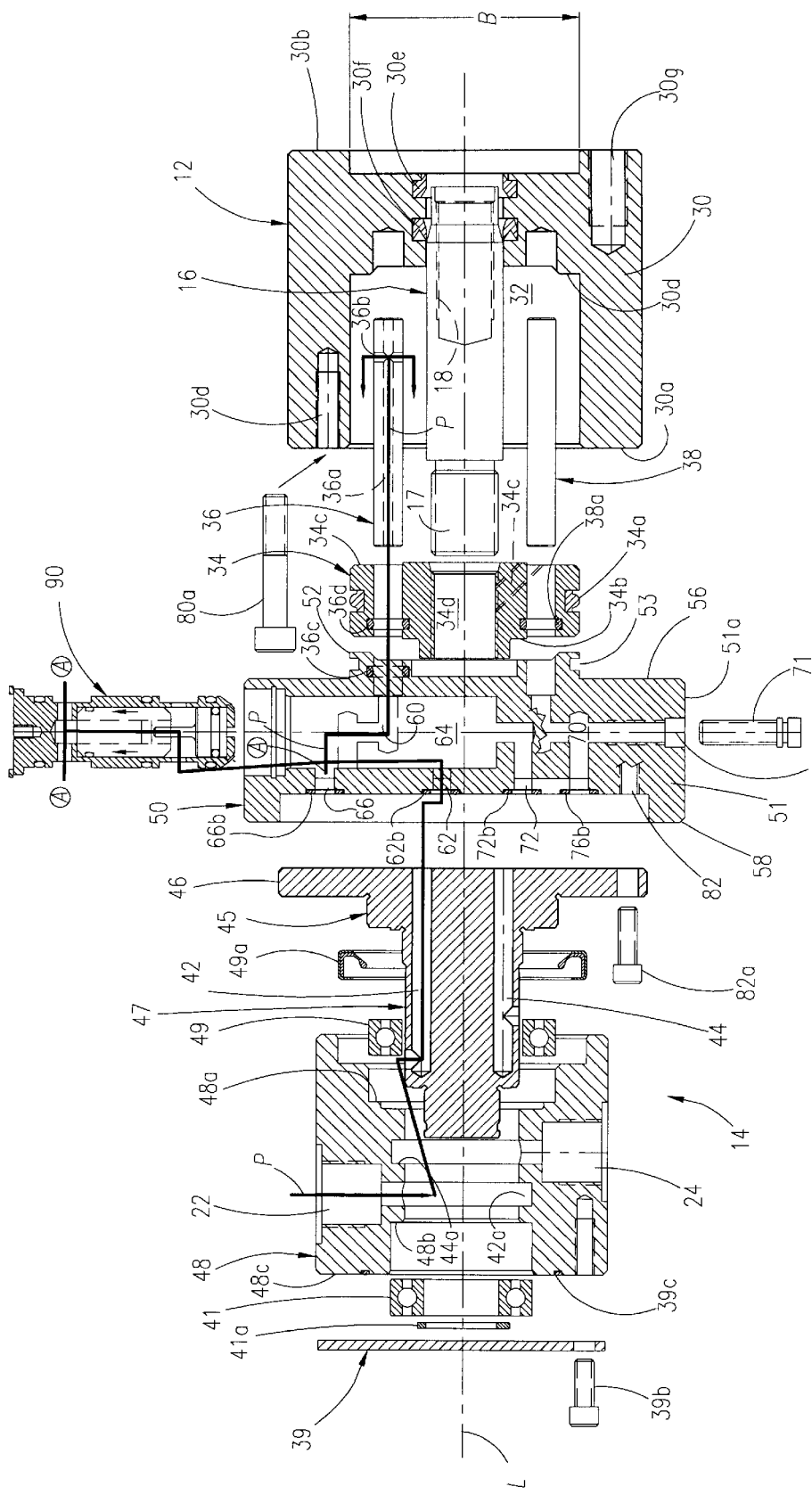
FIG. 11 is the sectional view of FIG. 4 showing a retract flow path through the rotary cylinder assembly.

Operation of the rotary cylinder assembly to move piston 34 to extend and retract work piece 220 will now be described. An illustration of the fluid flow path P through rotary cylinder assembly 10 to retract rod connector 16 and work piece 220 is shown in FIG. 11. Pressurized fluid is supplied into retract port 22, wherein it travels through passage 42 and into retract pilot channel 62. Retract pilot channel 62 extends between pilot port 110 and inlet port 104. The pressurized fluid at pilot port 110 causes piston 96 of the lock check cartridge housed in receptacle 74 to open the check valve 98 for reverse flow. The pressurized fluid further flows from inlet port 104 and enters inlet holes 92d of the lock check cartridge in receptacle 64. The fluid flows through the receptacle 64 check valve 98 in the direction of arrow F and out the outlet holes 92e to outlet port 102. Pressurized fluid flow continues through channel 66 and into retract port 60, through passage 36a of pin 36, and into chamber 32 through outlet 36b wherein the pressurized fluid acts on second side 34c of piston 34, thereby pushing piston 34 towards the position shown in FIG. 4.

To extend rod connector 16 and work piece 220, pressurized fluid is supplied into extend port 24, wherein it travels through passage 44 and into extend pilot channel 72. Extend pilot channel 72 extends between pilot port 100 an inlet port 114. The pressurized fluid at pilot port 100 causes piston 96 of the lock check cartridge housed in receptacle 64 to open the check valve 98 for reverse flow. The pressurized fluid further flows from inlet port 114 and enters inlet holes 92d of the lock check cartridge in receptacle 74, and flows through the check valve 98 in the direction of arrow F and out the outlet holes 92e to outlet port 112. Pressurized fluid flow continues through channel 76 and into extend port 70, where it enters chamber 32 around second pin 38 to act on first side 34b of piston 34, thereby pushing piston 34 towards end wall 34d.

If fluid supply pressure from retract port 22 or extend port 24 is lost, the pilot piston 96 of the lock check cartridge opened for reverse flow move in the direction opposite arrow F and seal through-hole 94a, releasing valve member 98a to seal against seat 98b thereby checking reverse flow. The other check valve 98 will also prevent reverse fluid flow since its piston 96 is already positioned against to seal through-hole 94a. The check valves thus isolate the fluid pressure in chamber 32, and further extension or retraction of piston rod connector 16 and work piece 220 is prevented until fluid supply pressure form ports 22, 24 is restored. Furthermore, the isolation of the pressurized fluid in rotary cylinder 12 allows the work piece chuck 210 to maintain its grip on work piece 220.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A rotary cylinder assembly for a machine tool, the rotary cylinder assembly extending along a longitudinal axis, comprising:
   a fluid shaft housing having extend and retract ports;
   a cylinder body housing a movable piston that extends or retracts a work piece mounted to the machine tool in response to fluid pressure supplied from said extend port or said retract port, respectively;
   a shaft end cover coupled between said fluid shaft housing and said cylinder body, said shaft end cover including:
      a first face orthogonally oriented to the longitudinal axis in sealing contact with said fluid shaft housing;
      a second face opposite said first face in sealing contact with said cylinder body; and
   a lock check system including first and second lock check cartridges housed in said shaft end cover, said lock check system further including a number of flow paths in communication with said extend and retract ports and said first and second lock check cartridges to provide fluid flow through said first and second lock check cartridges to said cylinder body, wherein at least a portion of at least one of said flow paths is formed by a channel along said first face.

2. The rotary cylinder assembly of claim 1, wherein said channel has a length along said first face between said first and second lock check cartridges.

3. The rotary cylinder assembly of claim 1, wherein said channel extends between a pilot port of said first lock check cartridge and an inlet port of said second lock check cartridge.

4. The rotary cylinder assembly of claim 3, wherein another of said flow paths includes a second channel extending between a pilot port of said second lock check cartridge and an inlet port of said first lock check cartridge.

5. The rotary cylinder assembly of claim 4, wherein:
   said first and second lock check cartridges extend parallel to and are positioned on opposite sides of a first central axis extending through a center of said shaft end cover;
   said shaft end cover has a second central axis extending through the center of said shaft end cover that is orthogonal to the first central axis; and
   each of said channels extend along said first face in a direction oriented generally non-orthogonally with respect to both the first central axis and the second central axis, each of said channels including a midportion at the first central axis that extends generally parallel to the second central axis.

6. The rotary cylinder assembly of claim 4, wherein each of said channels has a length and forms a slight S shape therealong.

7. The rotary cylinder assembly of claim 1, further comprising a sealing member positioned around a periphery of said channel that contacts said fluid shaft housing.

8. The rotary cylinder assembly of claim 1, wherein said first and second lock check cartridges are parallel to and positioned on opposite sides of a first central axis extending through a center of said shaft end cover.

9. The rotary cylinder assembly of claim 8, wherein:
   said shaft end cover has a second central axis that is orthogonal to said first central axis and extends through the center of said shaft end cover;
   said first lock check cartridge is substantially located on a first side of said second central axis and said second lock check cartridge is substantially located on a second side of said second central axis; and
   said first lock check cartridge extends to a pilot port located on said second side of said second central axis and said second lock check cartridge extends to a pilot port located on said first side of said second central axis.

10. The rotary cylinder assembly of claim 1, wherein said shaft end cover includes an annular ring member extending from said second face, said cylinder body having a piston chamber sized to receive said ring member in close fitting engagement.

11. The rotary cylinder assembly of claim 10, wherein said ring member has a diameter of about three inches.

12. The rotary cylinder assembly of claim 1, wherein said channel is open toward and defines an offset along said first face.

13. The rotary cylinder assembly of claim 12, wherein said channel defines a slight S-shape along said first face.

14. A rotary cylinder assembly for a machine tool, comprising:
   a fluid shaft housing having extend and retract ports;
   a cylinder body housing a movable piston removably attached to a rod connector that extends or retracts a work piece mounted to the machine tool in response to fluid pressure supplied from said extend port or said retract port, respectively;
   a shaft end cover coupled between said fluid shaft housing and said cylinder body, said shaft end cover including a first central axis and a second central axis orthogonally oriented to the first central axis and each of said first and second central axes extending through a center of said shaft end cover, said shaft end cover including:
      a first face in sealing contact with said fluid shaft housing;
      a second face in sealing contact with said cylinder body and configured such that said piston cannot extend therethrough;
   a lock check system housed including first and second lock check cartridges housed in said shaft end cover extending parallel to and on opposite sides of the first central axis, said lock check system further including a number of flow paths therethrough in communication with said extend and retract ports and said first and second lock check cartridges to provide fluid flow therethrough to said cylinder body, wherein:

said first lock check cartridge is substantially located on a first side of the second central axis and said second lock check cartridge is substantially located on a second side of the second central axis; and said first lock check cartridge extends to a pilot port located on the second side of the second central axis-and said second lock check cartridge extends to a pilot port located on the first side of the second central axis.

15. The rotary cylinder assembly of claim 14, wherein at least a portion of at least one of said flow paths is formed by a channel in said first face.

16. The rotary cylinder-assembly of claim 15, wherein said channel has a length along said first face extending between said first and second lock check cartridges.

17. The rotary cylinder assembly of claim 15, wherein said channel extends between said pilot port of said first lock check cartridge and an inlet port of said second lock check cartridge.

18. The rotary cylinder assembly of claim 17, wherein another of said flow paths includes a second channel extending between said pilot port of said second lock check cartridge and an inlet port of said first lock check cartridge.

19. The rotary cylinder assembly of claim 18, wherein each of said first and second channels extend along said first face in a direction generally non-orthogonally oriented with respect to both the first central axis and the second central axis.

20. The rotary cylinder assembly of claim 19, wherein each of said first and second channels includes a mid-portion at the first central axis that extends generally parallel to the second central axis.

21. A shaft end cover for housing for a lock check system, comprising:

a body extending along a longitudinal axis and having a first face and an opposite second face, each of said first and second faces being orthogonally oriented to the longitudinal axis; and first and second lock check cartridges positioned in said body; and a number of flow paths in communication with said first and second lock check cartridges providing fluid flow through said first and second lock check cartridges, wherein one of said number of flow paths includes a first channel along said first face that extends between a pilot port of said first lock check cartridge and an inlet port of said second lock check cartridge and another of said flow paths includes a second channel formed along said first face extending between a pilot port of said second lock check cartridge and an inlet port of said first lock check cartridge.

22. The shaft end cover of claim 21, wherein each of said first and second channels has a length along said first face between said first and second lock check cartridges.

23. The shaft end cover of claim 21, wherein:

said first and second lock check cartridges extend parallel to and are positioned on opposite sides of a first central axis extending through a center of said body;

said body has a second central axis extending through the center of said body that is orthogonal to the first central axis; and each of said channels extend along said first face in-a direction oriented generally non-orthogonally with respect to both the first central axis and the second central axis.

24. The shaft end cover of claim 23, wherein each of said channels includes a mid-portion at the first central axis that extends generally parallel to the second central axis.

25. The shaft end cover of claim 21, wherein said body includes:

a first through port extending between said first face and said second face;

a second through port extending between said first face and said second face;

a third channel formed in said first face extending between an outlet port of said first lock check cartridge and said first through port; and a fourth channel formed in said first face extending between an outlet port of said second lock check cartridge and said second through port.

26. The shaft end cover of claim 25, wherein each of said first, second, third and fourth channels each include a land formed therearound in said first face for receiving a seal.

27. The shaft end cover of claim 21, wherein said first and second channels are each open toward and define an offset along said first face.

28. The shaft end cover of claim 27, wherein each of said first and second channels define a slight S-shape along said first face.

* * * * *